United States Patent [19]

Tang et al.

[11] Patent Number: 4,752,494
[45] Date of Patent: Jun. 21, 1988

[54] THERMOSTABLE EDIBLE CREME

[75] Inventors: Jiunn-Yann Tang, Dallas; Jiann-Yuh Chen, Irving, both of Tex.

[73] Assignee: Frito-Lay, Inc., Dallas, Tex.

[21] Appl. No.: 22,057

[22] Filed: Mar. 5, 1987

[51] Int. Cl.$^4$ .............................................. A23L 1/04
[52] U.S. Cl. .................................. 426/573; 426/572; 426/573; 426/578; 426/613; 426/653; 426/657; 426/283; 426/284; 426/330; 426/330.2
[58] Field of Search ............... 426/94, 572, 573, 658, 426/613, 580, 607, 283, 284, 653, 608, 330, 606, 657, 330.2

[56] References Cited

U.S. PATENT DOCUMENTS

| | | | |
|---|---|---|---|
| 2,359,228 | 9/1944 | Lloyd et al. | 426/572 |
| 3,244,536 | 4/1966 | Kidger | 426/572 |
| 3,253,928 | 5/1966 | Bedenk | 426/572 |
| 3,310,406 | 3/1967 | Webster | 426/580 |
| 3,600,196 | 8/1971 | Heine et al. | 426/572 |
| 4,251,562 | 2/1981 | LeGrand | 426/580 |
| 4,298,625 | 11/1981 | Cillario | 426/572 |
| 4,497,834 | 2/1985 | Barta | 426/573 |
| 4,551,346 | 11/1985 | Kilroy | 426/613 |
| 4,610,884 | 9/1986 | Lewis, III | 426/572 |
| 4,612,198 | 9/1986 | Wallin et al. | 426/283 |
| 4,670,272 | 6/1987 | Chen | 426/572 |

*Primary Examiner*—Jeanette Hunter
*Attorney, Agent, or Firm*—Bernard, Rothwell & Brown

[57] ABSTRACT

A bland, intermediate water activity matrix suitable for use in preparing a thermostable, edible creme, is produced by dispersing $Ca^{++}$ ions, caseinate ions, corn syrup, lactose and maltodextrin in water; and heating the dispersion to a temperature sufficient to gel the $Ca^{++}$ ions and caseinate ions. The bland, intermediate water activity matrix can be converted to a low water activity thermostable creme by admixing it with modified starch, a fat and an emulsifier, and a flavoring material. The thermostable, edible creme can be incorporated into shelf-stable, ready-to-eat bakery products.

30 Claims, 1 Drawing Sheet

THERMOSTABLE EDIBLE CREME

BACKGROUND OF THE INVENTION

1. Field of the Invention

This invention relates to the production of comestible products, particularly to the production of thermostable edible fillings, which can be sweet or non-sweet, and to a base matrix for producing the thermostable edible fillings. The invention also relates to the production of shelf-stable ready-to-eat cooked dough products, i.e., baked or fried dough products, in which a thermostable filling is combined with the dough prior to cooking.

2. Prior Art

Most creme-filled dough products, e.g., filled pastries, cookies and the like, are produced by first cooking a dough preform and then filling the cooked preform with the creme. The post-cook filling procedure is generally inconvenient and expensive, particularly in the commercial scale productiion of ready-to-eat creme-filled products. Pre-cook application of the creme to the dough product has not been widely employed because most of the edible cremes known in the prior art have exhibited poor thermal stability.

Edible cremes known in the prior art generally have high moisture levels and high water activities (typically, $A_w$ values of about 0.8 to 0.9). The water activity of a food is defined as the partial vapor pressure of water in the food divided by the saturation vapor pressure of pure water at the temperature of the food. It can be measured by placing a sample in a container, which is then sealed, and determining the relative humidity above the sample after equilibrium is reached. Water activity can be considered to be a measure of the tendency of a material to allow moisture to migrate out of the material to its surrounding environment.

The water activities of prior art cremes have been highly dependent on their water content. In order to achieve desirably creamy textures, it has been necessary to incorporate relatively large amounts of water into these cremes, which has resulted in high water activities. The high water activities associated with these cremes are problematical, especially when the cremes are used in a product in which it is in contact with materials of considerably lower water content, such as baked pastry doughs. Due to the disparity in moisture contents of the two materials and the relatively high water activity of the creme, moisture tends to migrate from the creme into the pastry dough, making the pastry soggy.

Cremes having high water activities also provide a medium which is conducive to microbial growth. Thus, ready-to-eat products containing cremes of the prior art tend to have limited shelf lives due to microbial growth.

The poor thermal stability of the high water activity cremes of the prior art manifests itself in a problem known as "syneresis" or more commonly "weeping." Weeping is characterized by an irreversible separation of water from the creme during cooking. The result, upon cooling of the product, is not only unappetizing in taste and appearance, but also contributes to sogginess of the pastry.

It would be highly desirable to produce a thermostable edible creme having a relatively low water activity, i.e., a water activity below about 0.7. Moreover, it would be desirable to produce such a creme in which the water activity is relatively independent of water content so that the texture can be controlled independently of water activity.

Copending, commonly assigned U.S. application Ser. No. 929,423 relates to a method of preparing thermostable cremes having water activities below about 0.7 by dispersing a modified starch in a low-moisture solvent system containing corn syrup and optionally lactose hydrolysate; dispersing at least one hydrocolloid in the starch/corn syrup dispersion; and cooking the dispersion. Fats and emulsifiers are generally added to improve texture. The cremes produced are generally sweet due to the presence of corn syrup, which acts as an humectant. There is often a need, however, for cremes which are non-sweet, e.g., savory.

SUMMARY OF THE INVENTION

The present invention provides a method for preparing thermostable edible fillings which can be sweet or non-sweet. The fillings of the invention are based on a bland, intermediate water activity ($A_w$) matrix. The fillings can be combined with various types of uncooked doughs and cooked together with the doughs to produce creme-filled pies, pastries, cookies and the like which are shelf-stable.

The bland, intermediate water activity base of the invention comprises a gelled aqueous dispersion of $Ca^{++}$ ions and caseinate ions. The dispersion contains a humectant system based on corn syrup. Preferably, the dispersion also contains lactose and maltodextrin. The calcium caseinate gel imparts a unique texture to the product which is soft and creamy. The use of lactose and maltodextrin (D.E.<20) in the humectant system instead of a larger amount of corn syrup allows the preparation of a bland matrix which can accommodate sweet or non-sweet flavor systems.

In a preferred embodiment of the invention, the calcium ions and lactose are provided to the matrix in the form of modified whey solids.

There is also provided a method of producing a bland, intermediate water activity base matrix for a thermostable filling which comprises dispersing $Ca^{++}$ ions, caseinate ions, corn syrup, and other ingredients such as lactose and maltodextrin in water; and heating the dispersion at a temperature sufficiently high to gel the caseinate.

There are also provided comestible products comprising a cooked dough, e.g., baked or fried dough, filled with a thermostable edible filling of the invention. The comestible product can be in the form of an extruded center-filled collet, creme puff, layered pastry, fried pie cookie or other form. In preparing the comestible product, the uncooked dough is first filled, layered or otherwise combined with the creme and the dough/creme composite is then cooked. Due to the thermostability of the filling, it is able to withstand the high temperatures of baking or frying without losing its texture. The comestible product thus produced has a relatively long shelf life, since the low water activity of the creme prevents moisture from migrating into the dough portion of the product and minimizes microbial activity. The fillings of the invention are also remarkably resistant to syneresis, which commonly occurs with prior art cremes when they are subjected to large temperature changes.

BRIEF DESCRIPTION OF THE DRAWING

The single FIGURE is a schematic representation of the method of the invention for producing an edible, thermostable filling.

DETAILED DESCRIPTION OF THE INVENTION

Figure 1:
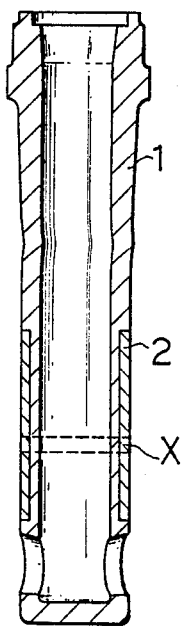
Figure 1:
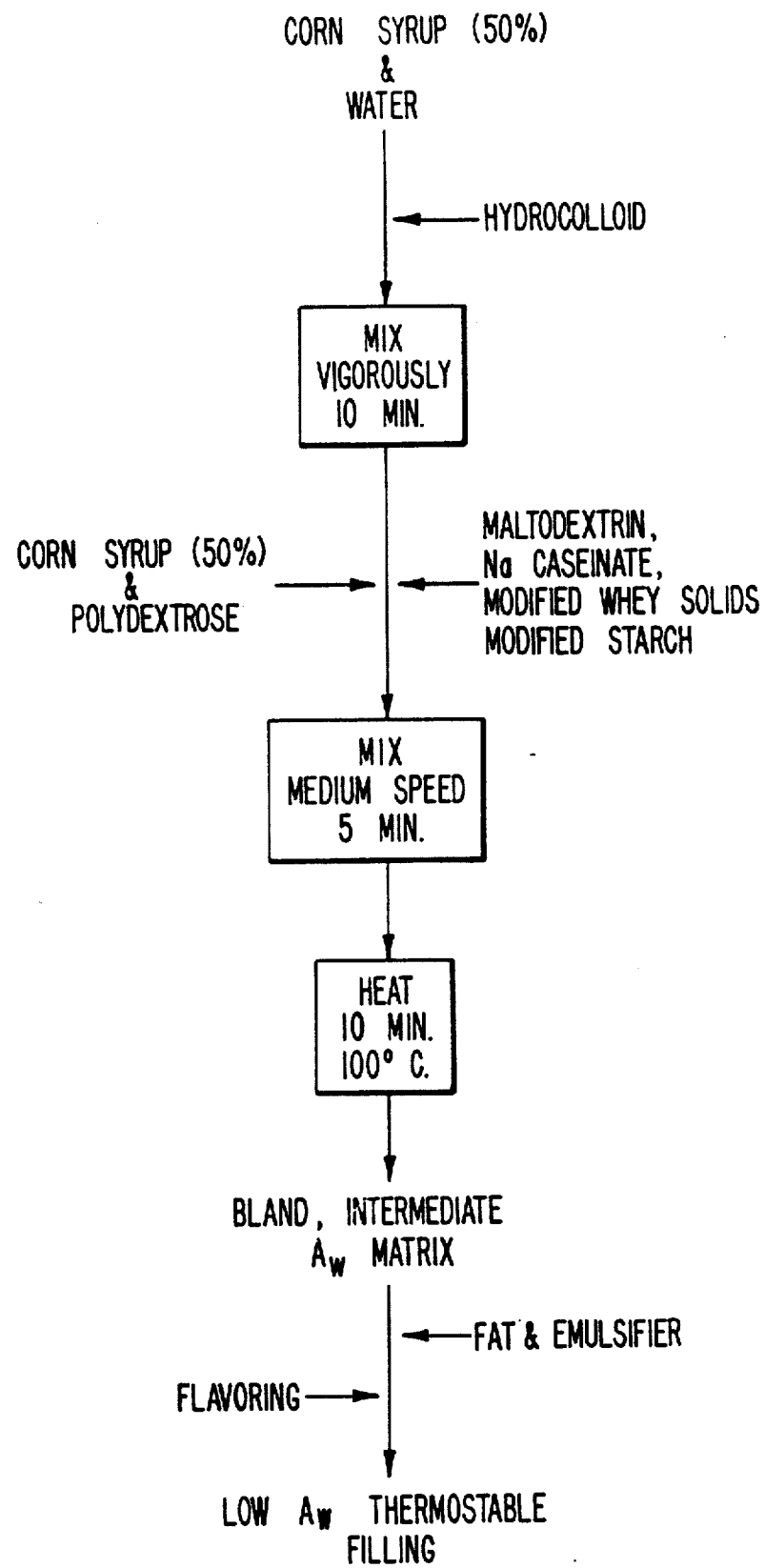

As previously indicated, the present invention provides a bland, intermediate water activity matrix suitable for use in the preparation of thermostable fillings. The matrix is produced by dispersing $Ca_{++}$ ions, caseinate, corn syrup, and other ingredients such as lactose and maltodextrin in water; and cooking the dispersion.

The corn syrup, lactose and maltodextrin combine to form an effective humectant system that is sufficiently bland to allow the incorporation of a variety of flavorings. Corn syrups can be described as concentrated water solutions of partially hydrolyzed corn starch. Corn syrups can be classified on the basis of D.E. values. The term D.E. is used herein to refer to the reducing sugars content of the dissolved solids in starch hydrolysates, expressed as percent dextrose, as measured by the Luff-Schoorl method (NBS circular C-40, page 195 as appearing in "Polarimetry, Saccharimetry and the Reducing Sugars" by Frederick J. Bates and Associates). Generally speaking, the corn syrup used in this invention has a D.E. value from about 24 to about 42. Preferably, the D.E. value is from about 36 to 42. Since corn syrups contain dextrose, maltose, and higher oligosaccharides derived from starch by acid or enzymatic hydrolysis or by a combination of the two, another basis for characterization of the corn syrup is with respect to the content of individual saccharides. For example, a particularly preferred corn syrup for use in the practice of the invention is a high fructose corn syrup.

Maltodextrin, which is also employed in the humectant system of the matrix, is also a starch hydrolysate. However, the maltodextrins generally have D.E. values lower than those of corn syrup solids. The D.E. values of the maltodextrins which can be used in the invention are selected to balance their humectant properties and lack of sweetness. Preferably, the maltodextrin employed in the composition of the invention has a D.E. value from about 4 to 20, most preferably from about 10 to 20.

The relative proportions of corn syrup, maltodextrin and lactose which are employed in the intermediate water activity matrix of the invention are such that the resulting matrix has a water activity between about 0.6 and 0.8, yet retains an essentially bland flavor. Generally, the corn syrup is present in the bland, intermediate $A_w$ matrix in an amount from about 30% to 80%; the maltodextrin is present in an amount from about 0% to 25%; and the lactose is present in an amount from about 0% to 10%, all based on the total weight of the bland, intermediate $A_w$-matrix composition. Preferably, the corn syrup is present in an amount from about 40% to 70%; the maltodextrin is present in an amount from 2% to 5%; and the lactose is present in an amount from about 2% to 5%.

It is to be understood that the degree of blandness of the matrix will depend largely on the D.E. value of the corn syrup and the amount of corn syrup in the matrix. Thus, when the amount of corn syrup exceeds about 70% by weight of the matrix, it is preferred to use a corn syrup having a D.E. value less than about 36 if one desires a bland matrix. There may be instances, however, where some sweetness in the matrix is permissible, for example, if the matrix is to be used in the preparation of a sweet flavored filling.

The soft, creamy texture of the filling composition of the invention is due to the gelling reaction between caseinate ions and $Ca^{++}$ ions. The caseinate ions and the $Ca^{++}$ ions can be provided to the composition in any convenient form. Caseinate ions, for example, can be provided in the form of sodium caseinate, potassium caseinate or calcium caseinate, all of which are readily commercially available. A preferred form for providing caseinate ions to the filling composition is sodium caseinate such as, for example, a product sold as Alanate ® 110. This product is a spray dried, flavor-reduced milk protein manufactured from edible casein. Generally, the sodium caseinate or other caseinate is provided to the composition in an amount from about 1% to 15%, preferably from about 2% to 10%, based on the total weight of the bland, intermediate $A_w$ matrix. $Ca^{++}$ ions are provided to the composition in an amount sufficient to gel the caseinate ions. Generally, a concentration from about 0.01% to 0.10% $Ca^{++}$ in the aqueous dispersion is sufficient to gel the caseinate. In a preferred embodiment of the invention, all or a portion of the lactose, and the $Ca^{++}$ ions are provided to the bland, intermediate water activity matrix in the form of modified whey solids. Modified whey solids are produced from whey fluid by first ultrafiltering to separate out protein. The liquid fraction containing water, lactose, $Ca^{++}$ and other mineral components, is known as whey permeate. Whey permeate is dried to produce modified whey solids. If desired, whey permeate can be employed as a lactose and $Ca^{++}$ source in the practice of the invention. The modified whey solids are provided to the matrix composition in an amount sufficient to provide the aforementioned percentages of lactose and $Ca^{++}$ ions Modified whey solids usually constitute about 0.45% $Ca^{++}$ and about 80% lactose. The modified whey solids, when present, generally are provided in an amount from about 4% to 12.5%, by weight of the bland, intermediate $A_w$ matrix. If necessary, additional sources of lactose and $Ca^{++}$ are used to supplement the amounts present in the whey solids.

If desired, all or a portion of the caseinate, $Ca^{++}$, whey and lactose can be provided to the intermediate $A_w$ matrix in the form of milk products, such as non-fat dry milk or whole-fat dry milk, both of which contain these ingredients. Since the proportions of these ingredients in milk products differs somewhat from their proportions in the bland, intermediate $A_w$ matrix, it may be necessary to supplement the amounts of one or more of the ingredients present in the milk product in order to achieve the desired proportions in the bland, intermediate $A_w$ matrix.

Other ingredients which can optionally be added to the bland, intermediate $A_w$ matrix include polydextrose, natural hydrocolloids and modified starch. Polydextrose acts as a bland bulking agent which can be used to control the water activity and sweetness of the matrix. Hydrocolloids help to establish the structure of the matrix due to their high water binding capacity and their gel-forming properties at high temperatures. The hydrocollids which can be used can be natural or synthetic gums and include such colloids as carrageenan, guar gum, alginate, xanthan gum and the like or methylcellulose, carboxymethylcellulose, ethylcellulose, hydroxypropylmethylcellulose and the like. If present, the polydextrose is employed in amounts from about 0% to 10%, preferably from about 0% to 5%, based on the weight of the bland, intermediate $A_w$ matrix. The hydrocolloid, if present, is employed in an amount from about 0% to 3%, preferably from about 0.5% to 2%, based on the weight of the bland, intermediate $A_w$ matrix.

Advantageously, a modified starch is also added to the bland, intermediate $A_w$ matrix in order to further reduce the water activity of the final filling and to stabilize the texture of the filling. The term "modified starch" as used herein includes both pregelatinized starch and cold water swellable starch. Cold water swellable starch is starch which has not been precooked, but retains granule structure similar to native starch and swells in water at room temperature. Suitable cold water swelling starches are commercially available, for example, under the names MIRA GEL 463, MIRA THIK 468 and MIRA THIK 469 (A. E. Staley Manufacturing Co., Decatur, Illinois). The modified starch is present in the bland, intermediate $A_w$ matrix in an amount from about 0% to 5% by weight, based on the total weight of the bland, intermediate $A_w$ matrix.

The above-described ingredients are dispersed in water. Although it is preferred to provide water to the matrix composition in addition to the water present in the corn syrup, there may be instances in which it is sufficient to disperse the ingredients in the corn syrup alone. Added water (exclusive of the water present in the corn syrup) is present in the bland, intermediate $A_w$ matrix in an amount from about 0% to 15%, preferably from about 5% to 12.5%, based on the total weight of the bland, intermediate $A_w$ matrix.

Referring to FIG. 1, which represents a preferred embodiment of the invention, a portion of the corn syrup, preferably about 40% to 60% of the total corn syrup, more preferably about 50% thereof, is dispersed in water. The hydrocolloid, if present, is then added and the dispersion is vigorously mixed, preferably from about 5 min. to 20 min., most preferably for about 10 min. The maltodextrin caseinate, modified whey solids, polydextrose, modified starch and the remainder of the corn syrup are then added and the dispersion is mixed, preferably for another 5 min. to 15 min., most preferably for about 5 min. Advantageously, the dispersion is mixed at this point at a speed equivalent to a medium speed on a commercial blender.

The dispersion is then heated to gel the $Ca^{++}$ ions and caseinate. Preferably, the dispersion is heated at a temperature from about 55° C. to 140° C. The dispersion is heated for a sufficient period of time to gel the caseinate. Generally, this occurs after about 5 min. to 10 min.

The resultant bland, intermediate $A_w$ matrix can then be converted to a low $A_w$ filling composition by the addition of fats and emulsifiers, which modify texture, and desired flavorings.

After heating the dispersion to produce the bland, intermediate $A_w$ matrix, and preferably while the dispersion is still at a temperature from about 60° C. to about 80° C., a fat and an emulsifier are preferably added to modify the texture and to provide desirable "mouthfeel." The fat can be high in unsaturation or it can be a saturated fat. Unsaturated fats give a softer texture to the creme. Unsaturated fats which can be employed include safflower oil, sunflower oil, cottonseed oil, soybean oil and corn oil. The saturated fats that can be used include the hydrogenated oil products of coconut, olive, corn, cottonseed, peanut, etc. While the melting points of the fats will generally vary according to the degree of saturation, fats having Wiley melting points of 80°–100° F. are preferred. A preferred fat is a coconut fat having a Wiley melting point of 92° F., which is commercially available under the name Hydrol® 92. The fat is heated to its melting point and added to the bland, intermediate $A_w$ matrix, together with the emulsifier, and thoroughly admixed therein. The amount of fat which is added is generally from about 0 parts by weight to 35 parts by weight per 100 parts of the bland, intermediate $A_w$ matrix.

Suitable emulsifiers include hydroxylated lecithin and mono-, di- or polyglycerides of fatty acids, such as monostearin and monopalmitin.

Many blends of emulsifiers are commercially used and readily available. For example, it may be desirable to provide a controlled hydrophilic-lypophilic balance (HLB) as with a lypophilic emulsifier such as glyceryl monostearate or sorbitan monostearate with a hydrophilic material such as Polysorbate 60. When a blend of emulsifiers is used, the HLB value should be from about 8 to about 13 because this range is more hydrophilic and forms oil in water emulsions. HLB values from 1 to 8 should be avoided since this range is more lypophilic and may provide undesirable properties to the product. A particularly preferred emulsifier is available commercially as Panodan SDK. The emulsifier is present in an amount from about 0 parts by weight to about 0.1 parts by weight per 100 parts of the bland, intermediate $A_w$ matrix.

Finally, flavoring agents are added to impart the desired flavor to the creme. As previously indicated, a major advantage of the method of the invention is that it provides a bland, thermostable matrix which can incorporate a variety of flavoring systems, including sweet and non-sweet flavors. Virtually any known flavoring materials can be blended into the creme. As merely exemplary of such materials, one can mention cheese powder, cocoa, cinnamon, tomato powder, meat, fruit (cherry, apple, etc.), vegetable meat pieces, nuts or dried fruit can also be incorporated. The flavoring materials are added in an amount effective to impart the desired flavor to the filling. While there is no strict lower or upper limit to the amount of flavoring material, the amount added is generally from about 0.01 parts by weight to 20 parts by weight per 100 parts of the bland, intermediate $A_w$ matrix.

The filling which is produced by the method of the invention has a water activity from about 0.6 to 0.8. It can be used to produce a variety of ready-to-eat comestible products. Particularly preferred products are those in which the creme is used to fill a dough or other farinaceous product and the filled composite is cooked. Due to the thermostability of the creme, the filling in the cooked product does not suffer from syneresis or loss of texture.

As merely exemplary of the type of products which can be produced using the creme of the invention, one can mention puffed pastries and fried or baked pie cookies. In the former, a conventional puff pastry dough is prepared and rolled out. A layer of creme filling is then placed on top of the rolled dough and the dough is folded over several times to produce alternating layers of dough and creme filling. The layered product is then rolled out and the process repeated until numerous alternating dough/filling layers are produced. The composite is then baked. Upon baking, internally generated steam causes the individual dough layers, which are partially insulated from each other by the creme filling, to rise and separate, thereby forming a flaky pastry. Those skilled in the art will recognize the foregoing procedure as the so-called "French method" of preparing flaky pastry, which is discussed in U.S. Pat. No. 4,622,226, issued to Victor Ke et al.

The fried or baked pie cookie is produced by rolling out a conventional pie dough, cutting it to a preform, usually circular in shape, and placing a portion of the creme filling of the invention in the center of the preform. The preform is then folded over the filling material and the dough edges pressed together, thereby forming a pocket filled with the creme filling. The filled dough can then be fried or baked.

Another method of preparing a filled product of the invention involves using the creme to continuously center-fill an extruded collet or C-shell. A suitable procedure for producing a center-filled collet is described in U.S. Pat. No. 3,615,675 to Wisdom et al. A puffed, expanded food product filled with the creme of the invention can be produced by extruding a farinaceous material, such as a corn meal and water mixture, through a generally C-shaped or annular die at a temperature which causes the water in the mixture to vaporize upon exiting the extruder, thereby puffing the extrudate. A tube extending through the center of the die orifice allows the creme of the invention to be continuously pumped into the central cavity of the extrudate as it emerges from the die. The filled material is then passed through an oven to reduce the moisture content of the outer shell, thereby rendering it crispy. Due to the low water activity of the creme of the invention, it retains its moist, creamy character through the baking process, so that the final product has duality of texture, i.e., a crisp outer shell material combined with a soft, creamy filling.

Due to the low water activities of the cremes produced by the method of the invention, the filled, cooked dough products resist migration of moisture from the filling into the dough portion of the product. Furthermore, the low water activity inhibits microbial growth. Consequently, the filled, ready-to-eat products incorporating the creme of the invention have shelf lives of about 60–90 days. The following examples further illustrate the present invention and are not intended to limit its scope in any way.

EXAMPLE I

A bland, intermediate $A_w$ matrix, suitable for use in preparing a low $A_w$ creme, was prepared from the following ingredients:

| Ingredient | Amount (lbs.) |
| --- | --- |
| Water | 9.6 |
| Corn syrup (D.E. 42) | 51.2 |
| Hydrocolloid (Avicel RC 591) | 1.9 |
| Polydextrose | 4.8 |
| Maltodextxrin (D.E. 10) | 2.9 |
| Sodium caseinate | 2.0 |
| Modified whey solids | 2.0 |
| Salt | 2.4 |

One-half the corn syrup, i.e, 25.6 lbs., was dispersed in the water. The Avicel RC 591 was then added and the dispersion was vigorously mixed for 10 minutes using a HOBART blender set on the highest speed. The maltodextrin, sodium caseinate, modified whey solids, salt, polydextrose and remaining half of the corn syrup were then added and mixing was continued for an additional 5 minutes on a medium speed setting. The mixture was then heated for 10 minutes at 100° C., after which time the dispersion had gelled. The resultant matrix was somewhat opaque and essentially flavorless. A portion was cooled to room temperature and its $A_w$ was found to be 0.70.

A low $A_w$, thermostable cheese-flavored creme filling was then prepared from the matrix. After the matrix dispersion had cooled to about 21° C., 9.6 lbs. of melted fat (Hydrol ® 92, Wiley melt point 92° F.) were added to the matrix, together with 0.2 lbs. of an emulsifier, Panodan SDK. After thoroughly blending the fat into the matrix, 9.6 lbs. of cheese powder were added and thoroughly blended. The resultant cheese flavored creme had a viscosity of 500,000 cps and a water activity of 0.68.

EXAMPLE II

A pie dough is prepared from enriched wheat flour, vegetable shortening, water, dextrose and salt. The dough is rolled out and cut into circles and 11 grams of the filling, prepared by a procedure similar to that of Example I, are placed in each circle. The dough is folded over and the edges sealed with water. The surface is docked and the dough/filling composites are baked by passage through a preheated five-zone oven, 6 feet in length, at a rate of 8"/min. The zone temperatures of the oven are as follows (T=top, B=bottom):

| | |
| --- | --- |
| Zone 1 | T - No heat |
| | B - 425° C. |
| Zone 2 | T - 177° C. |
| | B - 177° C. |
| Zone 3 | T - 177° C. |
| | B - 177° C. |
| Zone 4 | T - 160° C. |
| | B - 160° C. |
| Zone 5 | T - 425° C. |
| | B - No heat |

The baked composites are allowed to cool to room temperature. The filling does not exhibit any visible serious effects. The resultant pies can be stored for a substantial period of time under ambient conditions, after which time the baked dough portion will not exhibit any sogginess.

EXAMPLE III

A puff pastry dough is prepared from the following ingredients:

| Ingredients | Grams | % by Weight |
| --- | --- | --- |
| Shortening (120° F.) | 84.00 | 3.50 |
| Cream of Tartar | 4.32 | 0.18 |
| Bread Flour (11% protein) | 847.20 | 35.29 |
| Cold Water | 871.20 | 36.29 |
| Hydrocolloid (Crystal Gum TM) | 508.80 | 21.19 |
| Wheat Gluten | 84.00 | 3.50 |
| Annatto Color No. 3 | 1.20 | 0.05 |
| | 2400.72 | 100.00 |

The ingredients are mixed into a dough. After the dough is mixed and rested, the dough is folded in with 840 g (35% by weight of the dough) of roll-in shortening to form a laminated dough. The dough is then sheeted in a 1.5 mm layer. One gram of a thermostable filling is deposited on the sheeted pastry dough (1.5 mm;

1.8 g/piece). A second 1.5 mm layer of sheeted dough is added and the sandwiched product is cut into individual docked squares. The product is then baked at 500° F. for 6 minutes. After cooling the pastries, the outer layer has a flaky texture and the filling has a creamy texture. The pastry products can be stored for a substantial period of time at 24° C., and all the pastry products will have retained their flaky texture.

What is claimed is:

1. A method for producing a bland, intermediate water activity base matrix for use in a thermostable filling which comprises mixing $Ca^{++}$ ions, caseinate ions, and corn syrup to form an aqueous dispersion, the caseinate being present in an amount form about 1% to 15% by weight of the matrix and the $Ca^{++}$ ions being present in an amount sufficient to gel the caseinate ions; and heating the dispersion to a temperature sufficiently high to gel the caseinate.

2. A method as claimed in claim 1, wherein the dispersion further comprises lactose and maltodextrin.

3. A method as claimed in claim 2, wherein the $Ca^{++}$ ions and the lactose are introduced by adding modified whey solids or whey permeate to the aqueous dispersion.

4. A method as claimed in claim 2, wherein the maltodextrin has a D.E. value of about 20 or less and the corn syrup has a D.E. value from about 24 to 42.

5. A method as claimed in claim 2, wherein the aqueous dispersion comprises from 30% to 80% corn syrup; from 0% to 15% added water; from 1% to 15% modified whey solids; from 0% to 25% maltodextrin; and from 1% to 10% caseinate ions.

6. A method for producing a bland, intermediate water activity base matrix for use in a thermostable filling which comprises producing an aqueous dispersion containing from 30% to 80% corn syrup having a D.E. from 24 to 42; from 1% to 15% caseinate; from 0.01% to 0.10% $Ca^{++}$ ions; from 0% to 25% maltodextrin; from 0% to 10% lactose; from 0% to 15% added water; and from 0% to 5% modified starch.

7. A method for producing a bland, intermediate water activity base matrix for use in a thermostable filling which comprises producing an aqueous dispersion containing from 5% to 10% water; from 40% to 70% corn syrup; from 2% to 5% modified whey solids; from 2% to 5% maltodextrin; and from 2% to 5% caseinate.

8. A method for producing an edible thermostable filling which comprises:
(a) forming an aqueous dispersion of $Ca^{++}$ ions, caseinate ions and corn syrup;
(b) heating the dispersion produced in step (a) at a temperature sufficiently high to gel the $Ca^{++}$ ions and caseinate ions to produce a bland, intermediate $A_w$ matrix; and
(c) admixing the matrix with a fat, an emulsifier and a flavoring material.

9. A method as claimed in claim 8, wherein the aqueous dispersion comprises from 30% to 80% corn syrup; from 0% to 15% added water; from 1% to 15% modified whey solids; from 0% to 25% maltodextrin; and from 1% to 10% caseinate ions.

10. A method as claimed in claim 8, wherein the aqueous dispersion comprises from 40% to 70% corn syrup; from 5% to 10% added water; from 2% to 5% modified whey solids; from 2% to 5% maltodextrin; and from 2% to 5% caseinate ions.

11. A method as claimed in claim 8, wherein the dispersion comprises from 30% to 80% corn syrup having a D.E. from 24 to 42; from 1% to 15% caseinate; from 0.01% to 0.10% $Ca^{++}$ ions; from 0% to 25% maltodextrin; from 0% to 10% lactose; from 0% to 15% added water; and from 0% to 5% modified starch.

12. A method as claimed in claim 11, wherein the maltodextrin has a D.E. value of about 20 or less and the corn syrup has a D.E. value from about 24 to 42.

13. A method as claimed in claim 11, wherein the $Ca^{++}$ ions and lactose are introduced by adding modified whey solids or whey permeate to the aqueous dispersion.

14. A method as claimed in claim 8, wherein the amount of fat which is added to the bland, intermediate water activity matrix is from about 0 parts by weight to 35 parts by weight per 100 parts of the bland, intermediate water activity matrix.

15. A method as claimed in claim 8, wherein the amount of flavoring material which is added to the bland, intermediate water activity matrix is from 0.01 parts by weight to 20 parts by weight per 100 parts of the bland, intermediate water activity matrix.

16. A bland, intermediate water activity matrix for use in preparing a thermostable filling, comprising a gelled aqueous dispersion of $Ca^{++}$ ions and caseinate ions, said dispersion containing from 30% to 80% corn syrup; from 0% to 15% added water; from 0% to 10% lactose; from 0% to 25% maltodextrin; from 1% to 15% caseinate; from 0.01% to 0.10% $Ca^{++}$ ions; and from 0% to 5% modified starch.

17. A bland, intermediate water activity matrix as claimed in claim 16, wherein the dispersion comprises from 40% to 70% corn syrup having a D.E. from 24 to 42; from 5% to 12.5% added water; from 2% to 5% lactose; and from 2% to 5% maltodextrin.

18. A bland, intermediate water activity matrix as claimed in claim 16, wherein the corn syrup has a D.E. value from about 24 to about 42 and the maltodextrin has a D.E. value less than about 20.

19. A bland, intermediate water activity matrix as claimed in claim 16, wherein the matrix contains from about 2% to 5% modified whey solids or whey permeate.

20. An edible, thermostable filling comprising:
(a) a bland matrix comprising a gelled aqueous dispersion of $Ca^{++}$ ions and caseinate ions containing from 40% to 70% corn syrup; from 5% to 10% added water; from 2% to 5% lactose; and from 2% to 5% maltodextrin;
(b) from 0 parts by weight to 35 parts by weight, per 100 parts of the bland matrix, of a fat;
(c) from 0.01 parts by weight to 0.1 parts by weight, per 100 parts of the bland matrix, of an emulsifier; and
(d) from 0.01 parts by weight to 20 parts by weight, per 100 parts of the bland matrix, of a flavoring material.

21. An edible, thermostable creme as claimed in claim 20, wherein the matrix contains from 2% to 5% modified whey solids or whey permeate.

22. An edible, thermostable creme as claimed in claim 20, having a water activity from about 0.6 to 0.8.

23. A method of producing a shelf-stable, ready-to-eat bakery product comprising filling an uncooked dough preform with a thermostable, edible filling as claimed in claim 20 and cooking the filled dough preform.

24. A method as claimed in claim 23, wherein the filled, uncooked dough preform comprises alternating layers of puff pastry dough and thermostable, edible filling.

25. A shelf-stable, ready-to-eat bakery product produced by the method of claim 23.

26. A shelf-stable, ready-to-eat bakery product produced by the method of claim 24.

27. A comestible product comprising a cooked dough filled with a thermostable filling, said filling comprising:
(a) a bland matrix comprising a gelled aqueous dispersion of $Ca^{++}$ ions and caseinate ions containing from 40% to 70% corn syrup; from 5% to 10% added water; from 2% to 5% lactose; and from 2% to 5% maltodextrin;
(b) from 0 parts by weight to 35 parts by weight, per 100 parts of the bland matrix, of a fat;
(c) from 0.01 parts by weight to 0.1 parts by weight, per 100 parts of the bland matrix, of an emulsifier; and
(d) from 0.01 parts by weight to 20 parts by weight, per 100 parts of the bland matrix, of a flavoring material.

28. A comestible product as claimed in claim 27, wherein the matrix contains from 2% to 5% modified whey solids or whey permeate.

29. A comestible product as claimed in claim 27, wherein the cooked dough forms an outer shell surrounding the thermostable filling.

30. A comestible product as claimed in claim 27, in the form of a puff pastry.

* * * * *

UNITED STATES PATENT AND TRADEMARK OFFICE
CERTIFICATE OF CORRECTION

PATENT NO. : 4,752,494

DATED : June 21, 1988

INVENTOR(S) : Jiunn-Yann Tang et al.

It is certified that error appears in the above-identified patent and that said Letters Patent is hereby corrected as shown below:

Please delete incorrect Figure 1 and substitute therefor the attached correct Figure 1.

Signed and Sealed this

Twentieth Day of December, 1988

*Attest:*

DONALD J. QUIGG

*Attesting Officer*      *Commissioner of Patents and Trademarks*